(12) United States Patent
Petersson et al.

(10) Patent No.: US 8,975,852 B2
(45) Date of Patent: Mar. 10, 2015

(54) ELECTRIC MOTOR AND METHOD FOR CONTROLLING THE SAME

(75) Inventors: Ulf Petersson, Tollered (SE); Anders Erestam, Gothenburg (SE)

(73) Assignee: Husqvarna AB, Huskvarna (SE)

( * ) Notice: Subject to any disclaimer, the term of this patent is extended or adjusted under 35 U.S.C. 154(b) by 345 days.

(21) Appl. No.: 13/499,259

(22) PCT Filed: Sep. 29, 2009

(86) PCT No.: PCT/SE2009/051078
§ 371 (c)(1),
(2), (4) Date: Jun. 26, 2012

(87) PCT Pub. No.: WO2011/040845
PCT Pub. Date: Apr. 7, 2011

(65) Prior Publication Data
US 2012/0299521 A1    Nov. 29, 2012

(51) Int. Cl.
*H02H 7/08* (2006.01)
*H02H 11/00* (2006.01)
(Continued)

(52) U.S. Cl.
CPC .............. *H02P 25/14* (2013.01); *H02P 23/14* (2013.01); *H02P 29/0061* (2013.01); *H02P 29/022* (2013.01)
USPC .... 318/490; 73/54.16; 73/54.43; 73/862.623; 340/870.17; 340/449; 340/500; 340/501; 361/24; 361/25; 361/158

(58) Field of Classification Search
CPC ...... G01R 31/36; H02K 11/001; H02P 23/14; H02P 25/14; H02P 29/0061
USPC ............... 318/490, 340, 73; 340/870.17, 449, 340/500, 501; 361/24, 25, 158; 73/54.16, 73/54.43, 862.623
See application file for complete search history.

(56) References Cited

U.S. PATENT DOCUMENTS 7,242,166 B2 *  7/2007  Swahn et al. ................... 322/28
2003/0076065 A1  4/2003  Shafer et al.
(Continued)

FOREIGN PATENT DOCUMENTS

| WO | 0117085 A1 | 3/2001 |
| WO | 2004012327 A1 | 5/2004 |
| WO | 2011040845 A1 | 4/2011 |

OTHER PUBLICATIONS

Zhi Gao, et al. "A Novel Online Rotor Temperature Estimator for Induction Machines Based on a Cascading Motor Parameter Estimation Scheme", 5th IEEE International Symposium on Diagnostics for Electric Machines, Power Electronics and Drives, Sep. 2005, 6 pages.
(Continued)

*Primary Examiner* — Rita Leykin
(74) *Attorney, Agent, or Firm* — Novak Druce Connolly Bove + Quigg LLP

(57) ABSTRACT

An electric motor (100) having a motor control system (400) including: —a current measuring means (402) for directly or indirectly measuring the electric current in the rotor windings (7) providing a rotor current value/s, —an ambient temperature measuring/estimation means (404) for measuring or estimating the ambient air temperature providing an air temperature value/s, —a rotor temperature estimation means (406, 407, 408, 409, 410, 411) for estimating a rotor temperature at least based on the rotor current value/s and the air temperature value/s, and—a current limiting means (405) for preventing overheating/burning of the rotor assembly (3) by limiting the electric current to the rotor windings (7) when the estimated rotor temperature exceeds a predetermined overheating threshold (412).

17 Claims, 4 Drawing Sheets

(51) Int. Cl.
*H02P 25/14* (2006.01)
*H02P 23/14* (2006.01)
*H02P 29/00* (2006.01)
*H02P 29/02* (2006.01)

(56) References Cited

U.S. PATENT DOCUMENTS

2003/0133235 A1* 7/2003 Yung et al. ............ 361/23
2008/0121443 A1* 5/2008 Clark et al. ............ 180/65.1
2011/0175006 A1* 7/2011 Dolenti et al. ......... 251/129.11

OTHER PUBLICATIONS

Milanfar, P, et al. "Monitoring the Thermal Condition of Permanent-Magnet Synchronous Motors", IEEE Transaction on Aerospace and Electronic Systems, vol. 32, No. 4, Oct. 1996, pp. 1421-1429.
Written Opinion for International Application No. PCT/SE2009/051078, dated Jun. 2, 2010, 5 pages.
International Preliminary Report on Patentability for International Application No. PCT/SE2009/051078, dated Oct. 27, 2011, 5 pages.
International Search Report for International Application No. PCT/SE2009/051078, Jun. 2, 2010, 5 pages.

* cited by examiner

ELECTRIC MOTOR AND METHOD FOR CONTROLLING THE SAME

CROSS-REFERENCE TO RELATED APPLICATIONS

This application is a national stage entry of PCT/SE2009/051078, which was filed on Sep. 29, 2009, said application is expressly incorporated herein in its entirety.

TECHNICAL FIELD

The present invention relates to an electric motor for an electric tool. In particular, the electric motor comprises components for preventing overheating of the motor. The present invention also relates to a method for estimating a rotor temperature in an electric motor and to method for controlling an electric motor in order to prevent overheating of the motor.

BACKGROUND ART

In conventional AC-motors, average rotor current measurements are oftentimes adopted for estimating a rotor temperature. Examples of such motors are universal motors for driving various kinds of power tools and other equipment, as well as motors specifically adapted for a certain application, such as for a power cutters or for drilling machines, and particularly for driving a drill bit of a core drill via a water cooled gearbox. In the latter case the motor can be slidably mounted on a drill stand, which is anchored to the ground/floor and a core drill is arranged on an output shaft of the gearbox to be rotatably driven by the motor. Sliding the motor slowly down the drill stand feeds the drill bit deeper into the ground/floor/structure to be drilled.

The rotor is usually the most temperature exposed part of an AC-motor having an outer stator and an inner/central rotor fitted with rotor windings. At high load, the rotor windings warm up the rotor significantly and, depending on design, size and power dimensioning, the rotor may under certain operational conditions run the risk of overheating. As an example the rotor might withstand temperatures up to 180° C., but would be overheated and break down at higher temperatures. Since it is difficult and costly to measure the actual rotor temperature, it can instead be estimated. For example in Husqvarna motors provided with overheat protection, Elgard™, the current through the rotor is measured and if the current reaches a certain threshold value, the motor is switched into a pulsation mode, in which the current fed to the rotor is pulsating. A typical pulsation cycle time is 0.5 seconds. If the load of the motor is not reduced during the pulsation, the current is completely switched off if the motor load is not reduced within a predetermined time period. Since the rotor temperature depends not only on rotor current but also on other operational conditions, the full potential of the motor (and rotor) is not always available. To provide a motor in a certain power range with excellent reliability, it is therefore usually required to over-dimension the motor. However, over-dimensioning makes the motor more unwieldy, heavier, and more expensive than otherwise would be necessary.

SUMMARY OF THE INVENTION

In view of the above, it is an objective of the present invention to provide an alternative and/or improved electric motor and a method for controlling an electric motor by estimating its rotor temperature. In particular, a further objective is to provide a method for controlling an universal electric motor, preferably an AC motor, for a construction machine in order to prevent overheating of the motor.

In accordance with the present invention, this object is achieved by an electric motor for an electric tool including a stator, a rotor assembly with a central rotor shaft and rotor windings, and a motor control system, the motor control system including:
 a current measuring means for directly or indirectly measuring the electric current in the rotor windings providing a rotor current value/s,
 an ambient temperature measuring/estimation means for measuring or estimating the ambient air temperature providing an air temperature value/s, and
 a rotor temperature estimation means for determining a new rotor temperature estimate which is at least based on the rotor current value/s and the air temperature value/s.

Preferably the motor control system further includes a voltage limiting means for preventing overheating/burning of the rotor assembly by limiting the voltage over the rotor windings if the new rotor temperature estimate exceeds a predetermined overheating threshold.

Preferably the motor control system further includes a sound and/or light signaling means for signaling to the user that the rotor temperature is close or at overheating/burning temperatures, preferably by providing a sound and/or light signal if the new rotor temperature estimate exceeds a predetermined second threshold which preferably is lower than the first threshold.

Preferably the motor control system further includes a rotor speed measuring/estimating means for measuring or estimating the rotor speed, providing a rotor speed value/s, which is arranged to utilize the rotor speed value/s when determining the new rotor temperature estimate.

Preferably the motor control system further includes a memory for storing a previous rotor temperature estimate/s, which is utilized when determining the new rotor temperature estimate.

The present invention also relates to a method for controlling an electric motor by estimating its rotor temperature comprising the steps of:
 a) determining a rotor current value/s by measuring the electric current in the rotor winding,
 b) determining an air temperature value/s by measuring or estimating the ambient air temperature,
 c) determining a rotor speed value/s by measuring or estimating the rotational speed of the rotor,
 d) determining a new rotor temperature estimate based on said rotor current value of step a), said air temperature value of step b), and on said rotor speed value of step c).

Preferably the method further includes one or more of the following steps:
 e) comparing the estimated rotor temperature of step d) with a predetermined threshold, and
 f) if the estimated rotor temperature is greater than the predetermined threshold according to the comparison of step e), limiting the voltage over the rotor windings is activated.
 g) comparing the estimated rotor temperature of step d) with a predetermined second threshold, and
 h) if the estimated rotor temperature is greater than the predetermined second threshold according to the comparison of step e), providing a light and/or sound signal.
 i) if limiting the voltage of step f) is active, deactivate if the motor load is reduced, preferably by sensing that the electric current in the rotor winding is reducing.

j) if limiting the voltage of step f) has been active for a time period exceeding a switch-off threshold, the motor is switched off.

BRIEF DESCRIPTION OF THE DRAWINGS

Other objectives, features and advantages of the present solution will be better understood through the following illustrative and non-limiting detailed description of embodiments of the present solution, with reference to the appended drawings, where the same reference numerals will be used for similar elements, wherein.

MODE(S) FOR CARRYING OUT THE INVENTION

Figure 1:
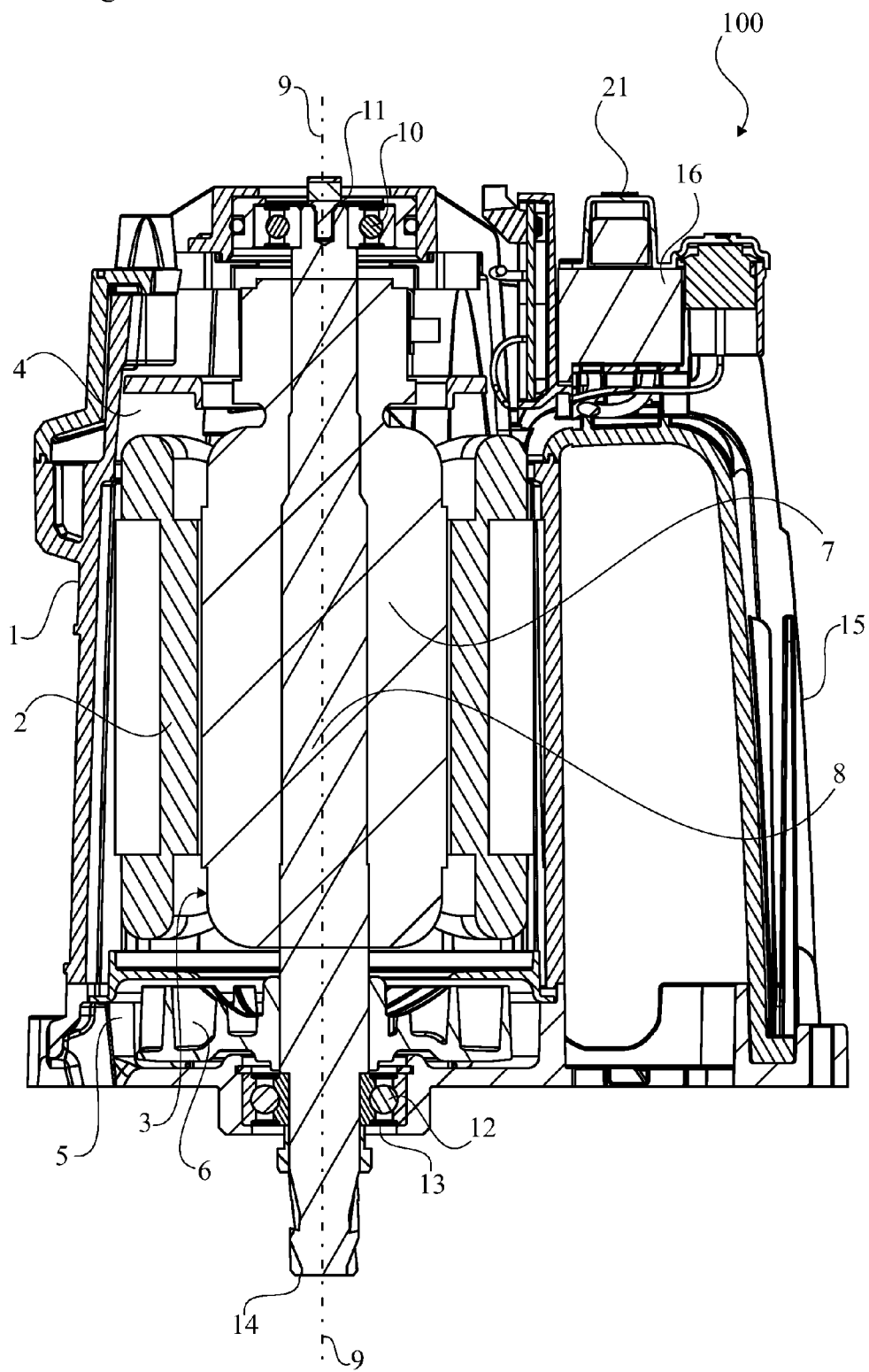
FIG. 1 is a cross sectional view taken along line I-I in FIG. 2 of a preferred embodiment of an electric single phase motor in accordance with the present invention.

FIG. 1 shows an electric single phase motor 100 having a rated power output of 2.7 kW. The motor is to be fed by 230 V, 50 Hz or by 120 V, 60 Hz. A motor housing 1 is containing a stator assembly 2, a rotor assembly 3, an inlet air conductor 4, an outlet air conductor 5, and a fan 6. Rotor assembly 3 includes rotor windings 7 and rotor shaft 8 having a longitudinal center axis 9. Rotor shaft 8 is rotatably supported in a first ball bearing 10 at an upper end 11 of the rotor shaft 8 and in a second ball bearing 12 at a bearing point 13 below the rotor windings 7. A lower end 14 opposite to the upper end 11 of the rotor shaft 8, constitutes an output shaft of the motor 100 for connection to a gearbox 200 (FIG. 3) for driving a rotatable working tool 300 (FIG. 3) at a convenient rotational speed. Fan 6 is fixedly attached to rotor shaft 8 for rotation at the same speed as the rotor shaft 8. Fan 6 is thereby drawing ambient air into the motor housing 1 via the inlet air conductor 4 and out via the outlet air conductor 5, the flowing air passing the rotor assembly 3 cooling it and other motor parts during operation. Motor 100 further comprises a handle 15 and a switch 16 with a switch button 21 for turning the motor on and off.

Figure 4:
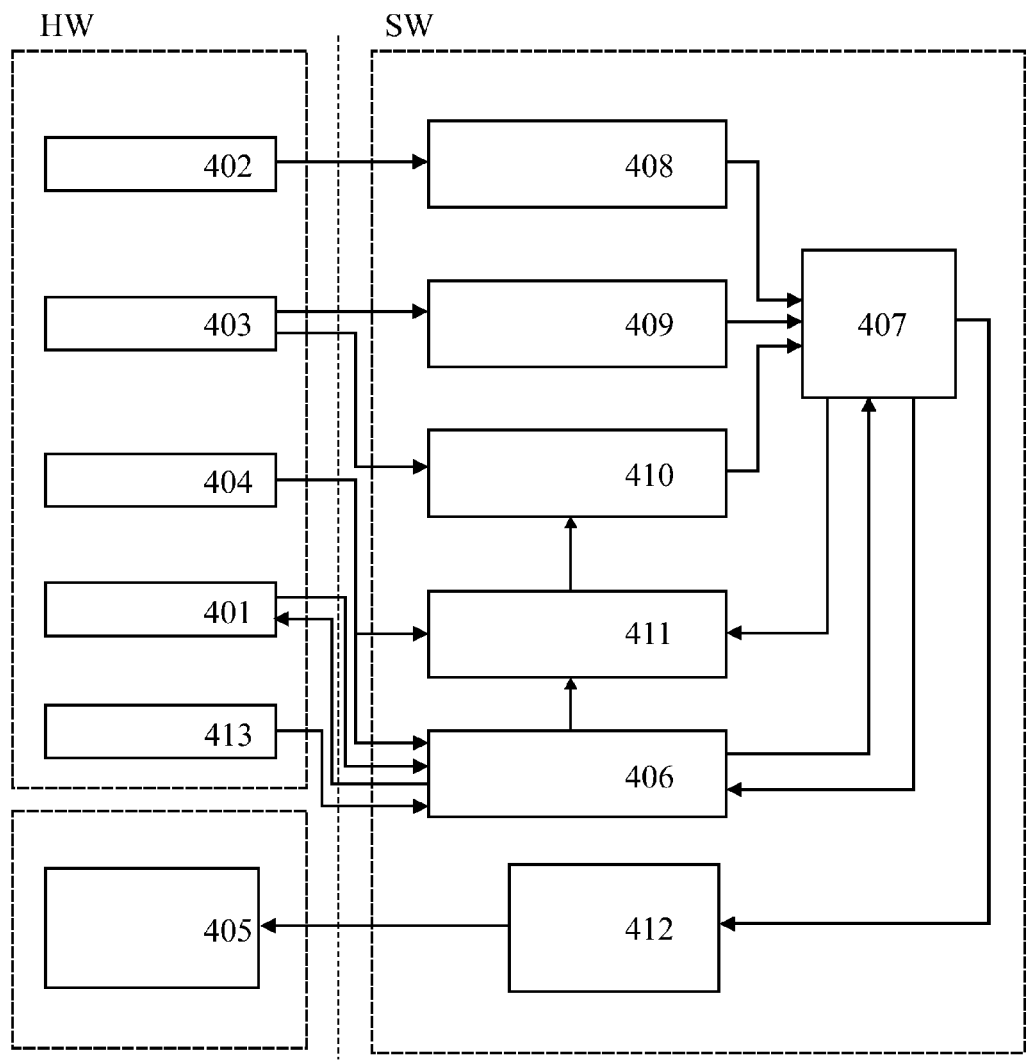
FIG. 4 is a block diagram of the hardware-software architecture used for estimating a rotor temperature of the motor.

A motor control system 400 is provided for controlling the speed of the motor 100 and includes both hardware 401-405, 413, and software 406-412. Of course the motor control system 400 includes further hardware (not shown) to execute software 406-412. In FIG. 4 a program flowchart over a HW-SW architecture of the motor control system 400 for motor control in accordance with the present invention is displayed. The hardware units 401-404, 413 for input to the software are a temperature memory 401, a rotor current measuring means 402, a rotor speed measuring/estimation means, preferably a rotor rotor-rpm sensor 403, an ambient temperature measuring/estimation means, preferably a temperature sensor 404, and a timer 413. The hardware also includes a voltage limiting means 405, for preventing overheating/burning of the rotor assembly 3 by limiting the voltage over the rotor windings 7, preferably by pulsation of the voltage over the rotor windings 7. The software is illustrated as boxes 406-412.

The memory 401 is an internal or external memory and is used for storing a rotor temperature estimate. The stored rotor temperature estimate, which we referrer to as the previous rotor temperature estimate $T_{rotor,\ k}$ is read by software box 406, and passed on to software box 407, to be used for iteration in a formula for estimating a new rotor temperature estimate $T_{rotor,\ k+1}$. The previous rotor temperature estimate $T_{rotor,\ k}$ is also passed on to software box 411. The new rotor temperature estimate $T_{rotor,\ k+1}$, is returned to software box 406 from software box 407, to be stored in memory 401 replacing the previous rotor temperature estimate $T_{rotor,\ k}$.

At start of the motor 100 software box 406 receives the last stored rotor temperature estimate from memory 401 (i.e. the temperature estimate at the time the motor was switched off and here referred to as $T_{rotor,\ 0}$) or a value that can be used to calculate the rotor temperature, an ambient air temperature value $T_{air}$ measured by the ambient air temperature sensor 404, and a timer value from the timer 413, indicating how much time has passed since the motor was switched off. The timer can e.g. be energized by a backup capacitor (not shown) having enough energy to power the timer a few hours (if the time from switch off is so long that the capacitor is drained, it is presumed that enough time has passed for the motor to be cooled, and hence the start value $T_{rotor,1}$ for the iteration is then set to the ambient air temperature value $T_{air}$). Else wise the start value is calculated by a formula $T_{rotor,1}=i(t_{rotor,\ 0}, T_{air})$, where i( ) is a function taken into account, the temperature of the motor at switch off, i.e. $T_{rotor,\ 0}$, the ambient air temperature $T_{air}$ (a low ambient air temperature will cool the motor quicker than a warmer ambient air temperature), and how much time t has passed since the motor was switched off (the longer time t that has passed the more the motor 100 has cooled, and hence the start value $T_{rotor,1}$ will approach the ambient air temperature $T_{air}$ with increasing time t).

Preferably the memory 401 is a non-volatile memory, i.e. maintaining information without constant power supply.

The rotor current measuring means 402, e.g. a transducer, measures the rotor current and passes the outputted rotor current value I to software box 408. Software 408 uses the rotor current value I in a function $f(a,I)$ which depends on the rotor current value I and a constant a, and passes the result on to box 407. The larger the rotor current value is the more it will contribute to the temperature estimation of box 407. The constant a can be determined based on factors such as the electric resistance in rotor windings 7, carbon brushes, and in the contact between the carbon brushes and the rotor collector (carbon brushes and rotor collector, not shown in the figure). Constant a is closely related to motor configuration and design and, therefore, is preferably tested empirically for each motor variant in question.

Figure 2:
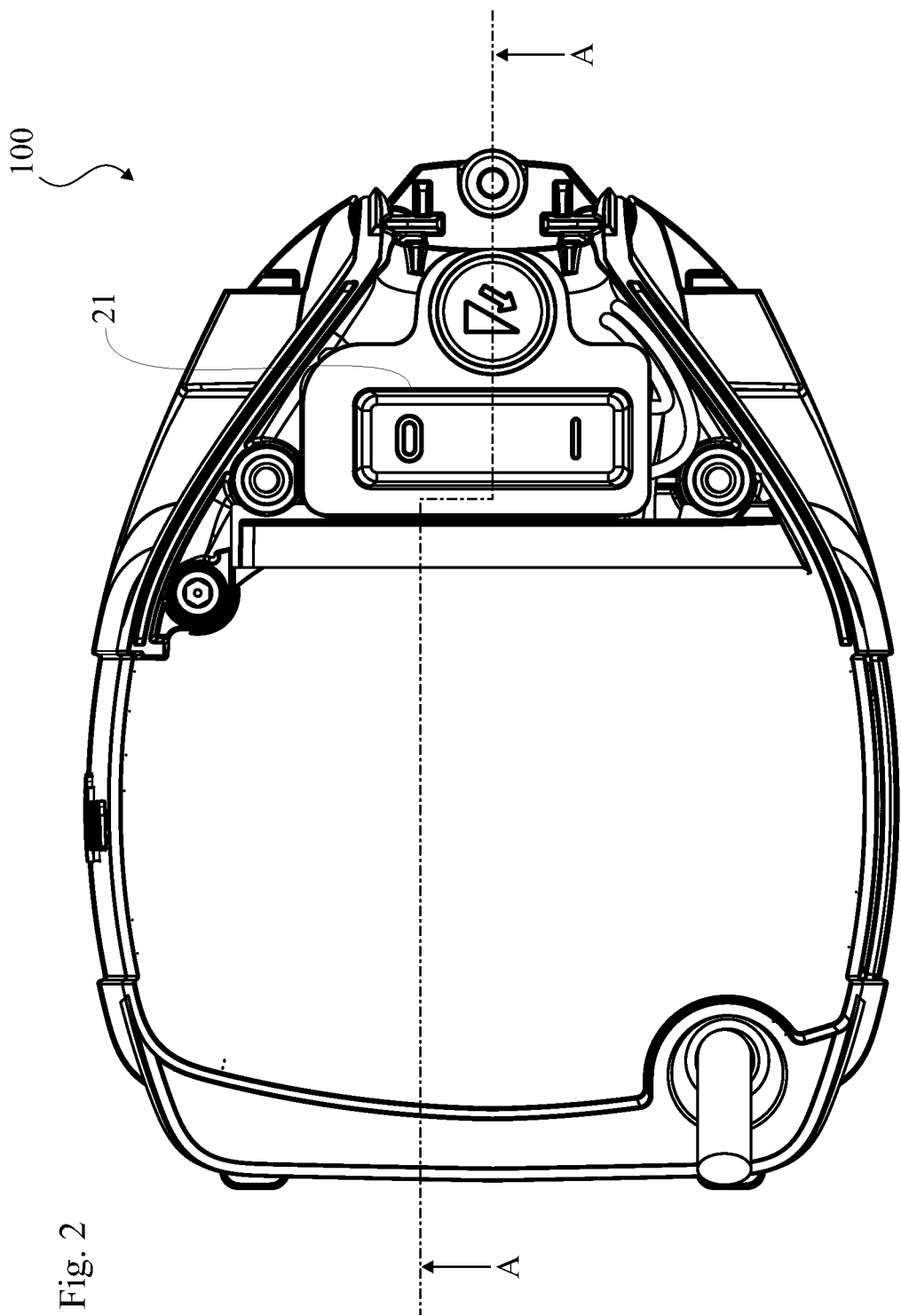
FIG. 2 is a top view of the electric single phase motor of FIG. 1.

The rotor-rpm sensor 403 for sensing/measuring the rotational speed of the rotor shaft 8 is located in the motor (the sensor is of a conventional type and has hence been omitted from display in FIGS. 1 and 2). The rotor-rpm sensor 403 can e.g. be a Hall effect sensor located in the proximity of the first ball bearing 10 sensing the rotation of an magnet at the upper end 11 of the rotor shaft 8. The rotor-rpm sensor 403 is connected to software boxes 409 and 410 for continuously delivering rotor speed values $N_{rotor}$ thereto.

Software 409 uses the rotor speed value $N_{rotor}$ in a function $g(b, N_{rotor})$ which depends on the rotor speed value $N_{rotor}$ and a constant b, and passes the result on to box 407. The larger the rotor speed value $N_{rotor}$ is the larger the heat contribution from friction is, and hence the function $g(b,N_{rotor})$ will provide larger values with increasing motor speed. Constant b depends on the mechanical friction of the rotor and is preferably tested empirically for each motor variant in question. The rotor speed value $N_{rotor}$ from rotor-rpm sensor 403 is also passed on to box 410.

The ambient air temperature sensor 404 is located on the stator assembly 2 for convenient measurement of the ambient air temperature (it is also of conventional type and is hence not shown in FIGS. 1 and 2). Alternatively, the ambient air temperature sensor 404 may be located elsewhere in the motor 100 for a convenient measurement of the ambient air temperature. The ambient air temperature sensor 404 continuously delivers actual air temperature values $T_{air}$ to software box 411. As an alternative to the ambient air temperature sensor 404, the motor 100 may instead be provided with means for estimating the ambient air temperature and deliver an estimated air temperature value $T_{air}$ to the software. For instance, the temperature of a components which temperatures are at least partly dependent of the ambient air temperature can be measured, e.g. a the temperature of a triac controlling the motor current could be used to estimate the ambient air temperature if the motor current and rotor speed also are measured, since its temperature will depend of these parameters.

Software box 411 also receives the previous temperature estimate $T_{rotor, k}$ from box 406. The ambient air temperature value $T_{air}$ sensed by sensor 404 is subtracted from the present rotor temperature value from box 406, i.e the previous temperature estimate $T_{rotor, k}$, and the resulting temperature difference $T_{rotor, k} - T_{air}$ is fed to box 410.

At software box 410 the rotor speed from rotor-rpm sensor 403 and the temperature difference $T_{rotor, k} - T_{air}$ from software box 411 are treated by a function $h(c, N_{rotor}, T_{rotor, k} - T_{air})$ and the result is forwarded to box 407. The function is adapted to provide larger values, the larger the temperature difference $T_{rotor, k} - T_{air}$ is. A high temperature difference will cool the rotor more than a smaller one (as long as the ambient air temperature is cooler than the rotor temperature). In the rare case that the ambient temperature is higher, the resulting value from the function h( ) will switch sign. The rotor speed also influences the rotor cooling, since the cooling fan 6 rotates with the rotor shaft. Thus a higher rotor speed increases the amounts of cooling air to the rotor assembly 3, and therefore the function h( ) is adapted to provide larger values, the larger the rotor speed value $N_{rotor}$ is. Constant c depends on the efficiency of the fan 6 that is cooling the motor 100 and is preferably tested empirically for each motor variant in question, the more effective the fan is the larger the constant c is. The function h( ) is adapted to provide larger values, the larger the constant c is.

In software box 407 a new rotor temperature estimate $T_{rotor, k+1}$ is estimated based on the previous rotor temperature estimate $T_{rotor, k}$ as received by software box 406, the rotor current value I, as received by software box 408 and the rotor speed value $N_{rotor}$ as received by software box 409. Preferably, the new rotor temperature estimate is also based on the difference between the previous rotor temperature estimate $T_{rotor, k}$ and the air temperature $T_{air}$, i.e. $T_{rotor, k} - T_{air}$. This is done by receiving inputs from software boxes 406-410. In an advantageous example the iteration formula is written:

$$T_{rotor,k+1} = T_{rotor,k} + f(a,I) + g(b, N_{rotor}) - h(c, N_{rotor}, T_{rotor,k} - T_{air})$$

$T_{rotor, k}$ is the output from box 406.
$f(a,I)$ is the output from box 408.
$g(b, N_{rotor})$ is the output from box 409.
$h(c, N_{rotor}, T_{rotor, k} - T_{air})$ is the output from box 410.
k=1, . . . is an index number for the iteration.

The new rotor temperature estimate $T_{rotor, k+1}$ is passed on to box 412, where it is compared to a first predetermined overheating threshold. If the rotor temperature estimate $T_{rotor, k+1}$ exceeds the first threshold, the motor current pulsating device 405 will be activated, whereby the current is pulsated with a cycle time of about 0.5 seconds. Then, if the load, e.g. by measuring a decreasing motor current, is reduced, the motor control system 400 switches back to normal operation. Otherwise, if load is not reduced within a predetermined time period, a switch-off threshold (e.g. 3-6 seconds), the motor control system 400 switches the motor 100 off. The first threshold value has been set by tests and suitably incorporates a safety margin. By way of example, the first threshold can be about 180° C.

In one embodiment, if the rotor temperature estimate $T_{rotor, k+1}$ does not exceed the first threshold, the rotor temperature estimate $T_{rotor, k+1}$ is compared to a predetermined second threshold, being lower than the first threshold. If the rotor temperature estimate $T_{rotor, k+1}$ exceeds the second threshold, the motor control system provides a sound and/or light signal as a warning to the user that the temperature is approaching overheat. By way of example, the second threshold can be about 160° C. Of course it would be possible to have even more thresholds providing more intense warning signals the larger the rotor temperature estimate $T_{rotor, k+1}$ becomes. For instance, having a light device shifting from green to orange to red, as the temperature estimate $T_{rotor, k+1}$ becomes larger.

In another embodiment, the motor control system 400 is not provided the motor current pulsating device 405. Instead the user will be warned by sound and/or light signals as described in the preceding paragraph. Here, the motor can be switched-off if a predetermined value being larger than all of the warning thresholds is exceeded and/or exceeding a threshold longer than a predetermined time period. Alternatively, the motor is never switched-off by the motor control system 400; rather the decision is left to the user to determine if he should switch off if he/she is warned.

Figure 3:
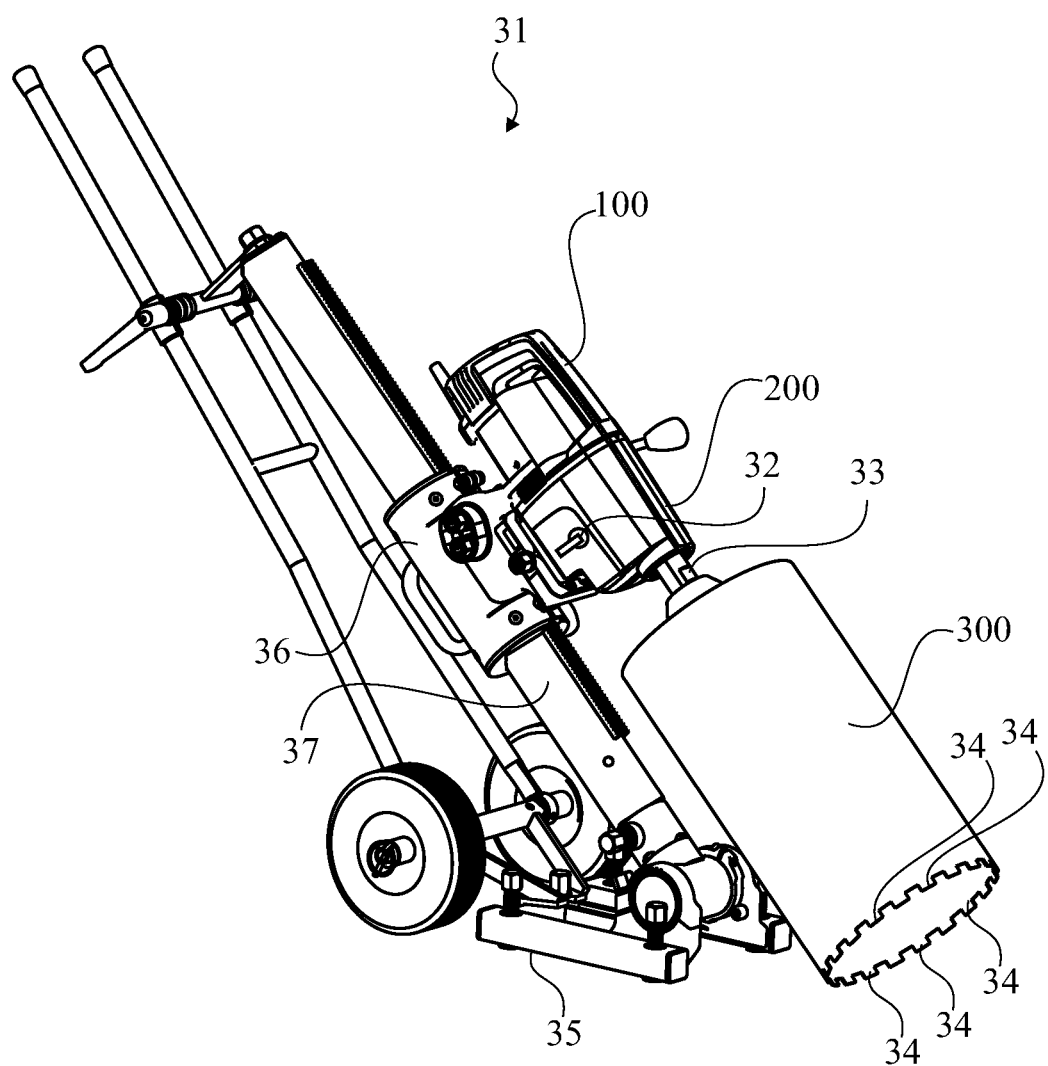
FIG. 3 is a perspective view of a core drilling machine mounted on a drill stand.

FIG. 3 shows a core drilling machine mounted on a drill stand 31. The motor 100 according to present solution is connected to a gearbox 200 with three different gears for selection of an optimal drilling speed by means of a gear shifting knob 32. Gearbox 200 is driven by a motor output shaft, in this case the rotor shaft 8, not visible in FIG. 3. A gearbox output shaft 33 is fixedly attached to a rotatable working tool, in this case a cylindrical hollow core drill 300 provided with cutting segments 34 around its lower end circumference facing downwards against the floor, ground, or structure to be drilled. Drill stand 31 further comprises a base plate 35 to be bolted onto the floor, ground, or structure to be drilled. The base plate 35 may also be attached by vacuum suction in a cavity (not shown) in the base plate, facing the floor, ground, or structure to be drilled. In that case, a seal (not shown) is ensuring air tightness between the vacuum cavity and the floor, ground, or structure to be drilled. The drill stand 31 further comprises a carriage 36 for moving the drilling machine downwards along a column 37 as the drilling proceeds.

Whereas the invention has been shown and described in connection with the preferred embodiment thereof it will be understood that many modifications, substitutions, and additions may be made which are within the intended broad scope of the following claims.

For instance, the rotor speed measuring/estimation means has been exemplified by an rotor-rpm sensor 403, it would also be possible to estimates the rotor speed value by using the rotor current value from the current measuring means 402 and a rotor voltage from a voltage measuring means, measuring the voltage of the rotor windings 7. Preferably such estimation could use motor characteristics when estimating the rotor speed value.

Further, the rotor current measuring means 402 could also measure the rotor current indirectly, for instance by using a rotor voltage values from a voltage measuring means and rotor speed values from the rotor-rpm sensor 403. Also motor characteristics could be used in such indirect measuring.

Further, even though the different functions has been exemplified by using single values, it would of course be possible to use several values, for instance by forming moving averages or by other well known statistical treatments.

The invention claimed is:

1. A single phase universal electric motor of a portable electric tool, the motor including a stator, a rotor assembly with a central rotor shaft and rotor windings, and a motor control system, the motor control system including:
    a current measuring device for directly or indirectly measuring the electric current in the rotor windings providing a rotor current value,
    an ambient temperature measuring device for measuring or estimating the ambient air temperature providing an air temperature value, and,
    a rotor temperature estimation device for determining a new rotor temperature estimate utilizing the rotor current value and the air temperature value.

2. The electric motor according to claim 1, wherein the motor control system further includes a voltage limiting device for preventing overheating of the rotor assembly by limiting the voltage over the rotor windings if the new rotor temperature estimate exceeds a predetermined first threshold.

3. The electric motor according to claim 1, wherein the motor control system further includes at least one of a sound or light signaling device for signaling to the user that the rotor temperature is close or at overheating temperature.

4. The electric motor according to claim 3, wherein the at least one of the sound or the light signal device sends a signal if a new rotor temperature exceeds a predetermined second threshold.

5. The electric motor according to claim 1, wherein the motor control system further includes a rotor speed measuring device, for measuring or estimating the rotor speed, providing a rotor speed value, and in that the rotor temperature measuring device also is arranged to utilize the rotor speed value when determining the new rotor temperature.

6. The electric motor according to claim 5, wherein the rotor speed measuring device includes a rotor-rpm sensor for measuring the rotor speed of the rotor assembly.

7. The electric motor according to claim 5, wherein the rotor speed measuring device is arranged to estimate the rotor speed value by using the rotor current value from the current measuring device and a rotor voltage from a voltage measuring device, measuring the voltage of the rotor windings.

8. The electric motor according to claim 7, wherein the rotor speed measuring device also is arranged to utilize motor characteristics when estimating the rotor speed value.

9. The electric motor according to claim 1, wherein the motor control system further includes a memory for storing a previous rotor temperature, and in that the a rotor temperature measuring device also is arranged to utilize the previous rotor temperature when determining the new rotor temperature.

10. The electric motor according to claim 1, wherein the voltage limiting device is arranged to repeatedly cut the voltage over the rotor windings when activated.

11. A method for controlling a single phase universal electric motor of a portable electric tool, the motor comprising a stator and a rotor assembly with a rotor shaft and rotor windings, the method comprising:
    a) determining a rotor current value by measuring the electric current in the rotor winding,
    b) determining an air temperature value by measuring the ambient air temperature,
    c) determining a rotor speed value by measuring the rotational speed of the rotor,
    d) determining a rotor temperature based on said rotor current value of step a), said air temperature value of step b), and on said rotor speed value of step c).

12. The method according to claim 11, further including the steps:
    e) comparing the rotor temperature of step d) with a predetermined first threshold, and
    f) if the estimated rotor temperature is greater than the predetermined first threshold according to the comparison of step e), limiting the voltage over the rotor windings is activated.

13. The method according to claim 11, further including the steps:
    g) comparing the estimated rotor temperature of step d) with a predetermined second threshold, and
    h) if the rotor temperature is greater than the predetermined second threshold according to the comparison of step e), providing at least one of a light or sound signal.

14. The method according to claim 11, wherein in step d), determining the new rotor temperature estimate is also based on a previous rotor temperature.

15. The method according to claim 11, wherein in step f) limiting the voltage over the rotor windings is effected by repeatedly cutting the voltage over the rotor windings.

16. The method according to claim 11, wherein the method comprises a further step:
    if limiting the voltage of step f) is active, deactivate if the motor load is reduced.

17. The method according to claim 11, wherein the method comprises a further step:
    if limiting the voltage of step f) has been active for a time period exceeding a switch-off threshold, the motor is switched off.

* * * * *